United States Patent [19]

Ooki et al.

[11] Patent Number: 4,903,663
[45] Date of Patent: Feb. 27, 1990

[54] FUEL COMBUSTION CONTROL APPARATUS FOR AN ENGINE

[75] Inventors: Masayuki Ooki, Yokohama; Kazuhiro Higashiyama, Kanagawa, both of Japan

[73] Assignee: Nissan Motor Co., Inc., Yokohama, Japan

[21] Appl. No.: 254,641

[22] Filed: Oct. 7, 1988

[30] Foreign Application Priority Data

Oct. 9, 1987 [JP] Japan .............................. 62-253494
Oct. 9, 1987 [JP] Japan .............................. 62-253495

[51] Int. Cl.$^4$ ............................................. F02P 5/15
[52] U.S. Cl. ................................... 123/425; 123/417
[58] Field of Search ...................... 123/425, 435; 73/35

[56] References Cited

U.S. PATENT DOCUMENTS

| | | | |
|---|---|---|---|
| 4,586,475 | 5/1986 | Takahashi et al. | 123/425 |
| 4,610,232 | 9/1986 | Iwata | 123/425 |
| 4,612,901 | 9/1986 | Iwata et al. | 123/425 |
| 4,630,584 | 12/1986 | Higashiyama et al. | 123/425 |

FOREIGN PATENT DOCUMENTS 58-143169 8/1983 Japan .
212673 10/1985 Japan .
WO88/02069 3/1988 World Int. Prop. O. .

Primary Examiner—Tony M. Argenbright
Attorney, Agent, or Firm—Foley & Lardner, Schwartz, Jeffery, Schwaab, Mack, Blumenthal & Evans

[57] ABSTRACT

In an engine fuel combustion control apparatus for determining ignition advance angles on the basis of a regular map or a highoctane map, the current advance angle on the regular map is incremented as long as knocking is absent within a predetermined engine speed range, and the regular map is switched to the highoctane map only when the advance angle is equal to or larger than the reference map switching line and the maximum highoctane map retard angle simultaneously, in order to prevent hunting between the two maps. Further, the current advance angle on the highoctane map is decremented when knocking is present and the highoctane map is switched to the regular map when the advance angle is smaller than the maximum highoctane map retard angle. The map used immediately before an engine stop is used in the succeeding engine start, in order to prevent knocking or to obtain a high engine output at engine restart.

7 Claims, 6 Drawing Sheets

FUEL COMBUSTION CONTROL APPARATUS FOR AN ENGINE

BACKGROUND OF THE INVENTION

1. Field of the Invention

The present invention relates to a fuel combustion control apparatus for an engine mounted on an automotive vehicle, for instance, and more specifically to a fuel combustion control apparatus by which ignition timings (advance angles) can be determined on the basis of two, regular and highoctane, maps. Here, the fuel octane rating (number) is an index indicative of fuel antiknocking properties.

2. Description of the Prior Art

In general, when a spark ignition engine is driven by burning fuel at a high compression ratio or at advanced ignition timing, there exist problems in that the engine is overheated; the engine performance is decreased; and further the engine is damaged. The antiknocking property of fuel can be represented by octane rating. The octane ratings of gasoline now on sale are 83 octane in the case of regular gasoline and 93 octane in the case of super gasoline (referred to as highoctane gasoline). From the standpoints of engine thermal efficiency, highoctane gasoline is advantageous because it is possible to increase combustion speed as fast as possible and advance ignition timing as early as possible as long as the engine is operating without producing knocking.

Therefore, there are automotive vehicles on which an engine designed for highoctane gasoline is mounted (referred to as highoctane vehicles). However, if regular gasoline is used erroneously or unavoidably, there exists a problem in that a sufficient engine output power determined on the basis of highoctane gasoline is not generated or knocking is often produced and therefore the engine characteristics are deteriorated. Further, when highoctane gasoline is used for an automotive vehicle on which an engine designed for regular gasoline is mounted (referred to as regular vehicles), it is impossible to effectively utilize the antiknocking characteristics of the highoctane gasoline.

To overcome this problem, usually two ignition timing control maps are previously prepared for both regular and highoctane gasoline so that an appropriate map can be selected automatically according to the fuel to be used. Here, a control map represents appropriate relationship between ignition timings (advance angles) and engine speeds.

An example of fuel combustion control apparatus for an engine as described above is disclosed in Japanese Published Unexamined (Kokai) Patent Application No. 60-212673. In this apparatus, immediately after an engine has been started, the ignition timing is first controlled in accordance with a predetermined regular map; when the engine speed increases into a predetermined range, the ignition timing advance angle is incremented at a predetermined constant rate; when the incremented advance angle exceeds a reference map switching line without producing engine knocking, the fuel is determined as highoctane gasoline and therefore the regular map is switched to the highoctane map.

Further, while the highoctane map is being used, when knocking is produced, the advance angle is decremented, and when the decremented advance angle goes below the maximum highoctane map retard angle line, the highoctane map is switched to the regular map.

In the above-mentioned prior-art fuel combustion control apparatus for an engine, however, since two switching lines, that is, the reference map switching line along which the regular map is switched to the highoctane map and the maximum highoctane map retard angle line along which the highoctane map is switched to the regular map are provided, there exists a problem in that hunting occurs between the regular map and the highoctane map when the ignition timing advance angle is incremented in the regular map to between the reference map switching line and the maximum highoctane map retard angle line. This problem will occur under the following conditions, for instance: when the regular map is switched to the highoctane map within the range where the maximum highoctane map retard angles are larger than the reference map switching angles; since the advance angle is smaller than the maximum highoctane map retard angle at the succeeding control operation, the highoctane map is switched to the regular map again.

SUMMARY OF THE INVENTION

With these problems in mind, therefore, it is a primary object of the present invention to provide a fuel combustion control apparatus for an engine which can prevent the above-mentioned hunting operation, for providing better stability in fuel combustion control operation, in such a way that the switching operation from the regular map to the highoctane map is effected only when the advance angle is equal to or greater than the reference map switching angle and further the maximum highoctane map retard angle according to engine speed.

To achieve the above-mentioned object, a fuel combustion control apparatus for an engine, according to the present invention comprises: (a) first detecting means for detecting engine operation conditions; (b) second detecting means for detecting engine knocking; (c) map storing means, coupled to said first detecting means, for storing a regular map indicative of basic ignition advance angles with respect to engine operating conditions using regular gasoline, a highoctane map indicative of basic ignition advance angles with respect to engine operating conditions using highoctane gasoline, a reference map switching line indicative of standard ignition advance angles with respect to engine operating conditions along which the regular map is switched to the highoctane map, and a maximum highoctane map retard angle line with respect to engine operating conditions along which the highoctane map is switched to the regular map; (d) first commanding means, coupled to said first and second detecting means, for incrementing a current ignition advance angle during use of the regular map when said first detecting means detects operating conditions within a predetermined switching range and said second detecting means detects no knocking, and generating a first command to switch the regular map to the highoctane map only when the incremented ignition advance angle is equal to or larger than the reference map switching line and the maximum highoctane map retard angle line simultaneously; (e) second commanding means, coupled to said second detecting means, for decrementing a current ignition advance angle during use of the highoctane map when said second detecting means detects knocking, and generating a second command to switch the highoctane map to the regular map only when the decremented ignition advance angle is smaller than the maximum highoctane map retard angle; (f) calculating means, coupled to said map storing means and said first and second commanding means, for selecting any one of the regular and highoctane maps in response to the commands from said first and second commanding means and for calculating actual ignition advance angles on the basis of basic advance angles stored in the selected map; and (g) means, coupled to said calculating means, for effecting fuel combustion on the basis of the ignition advance angle calculated by said calculating means.

Further, to achieve the above-mentioned object, a method of determining engine ignition advance angles on the basis of a regular map or a highoctane map, according to the present invention comprises: (a) checking whether engine speed lies within a predetermined switching range; (b) if engine speed lies outside of the switching range, selecting the regular map; (c) if engine speed lies within the predetermined switching range, checking whether engine knocking is present or absent; (d) if present decrementing a current ignition advance angle; and if absent, incrementing a current ignition advance angle; (e) checking whether the ignition advance angle is equal to or larger than a reference map switching line indicative of standard ignition advance angles with respect to engine speeds along which the regular map is switched to the highoctane map; (f) if smaller than the reference map switching line, selecting the regular map; (g) if equal to or larger than the reference map switching line, checking whether the ignition advance angle is equal to or larger than the maximum highoctane map retard angle line with respect to engine speeds along which the highoctane map is switched to the regular map; (h) if smaller than the maximum highoctane map retard angle line, selecting the regular map; (i) if equal to or larger than the maximum highoctane map retard angle, checking whether a predetermined time has elapsed; (j) if the predetermined time has not elapsed, selecting the regular map; and (k) if the predetermined time has elapsed, selecting the highoctane map.

In the apparatus of the present invention, when the engine speed lies within a switching range, the ignition timing advance angle is incremented in the regular map as long as knocking is absent and the regular map is switched to the highoctane map only when the incremented advance angle is equal to or larger than the reference map switch angle and the maximum highoctane map retard angle simultaneously at each engine speed, therefore, once switched, fuel combustion control operation is effected on the basis of the switched highoctane map without producing map hunting.

Further, when knocking is present in the highoctane map, the current advance angle is decremented, and the highoctane map is switched to the regular map when the advance angle is smaller than the maximum highoctane map retard angle.

DETAILED DESCRIPTION OF THE PREFERRED EMBODIMENTS

Figure 1:
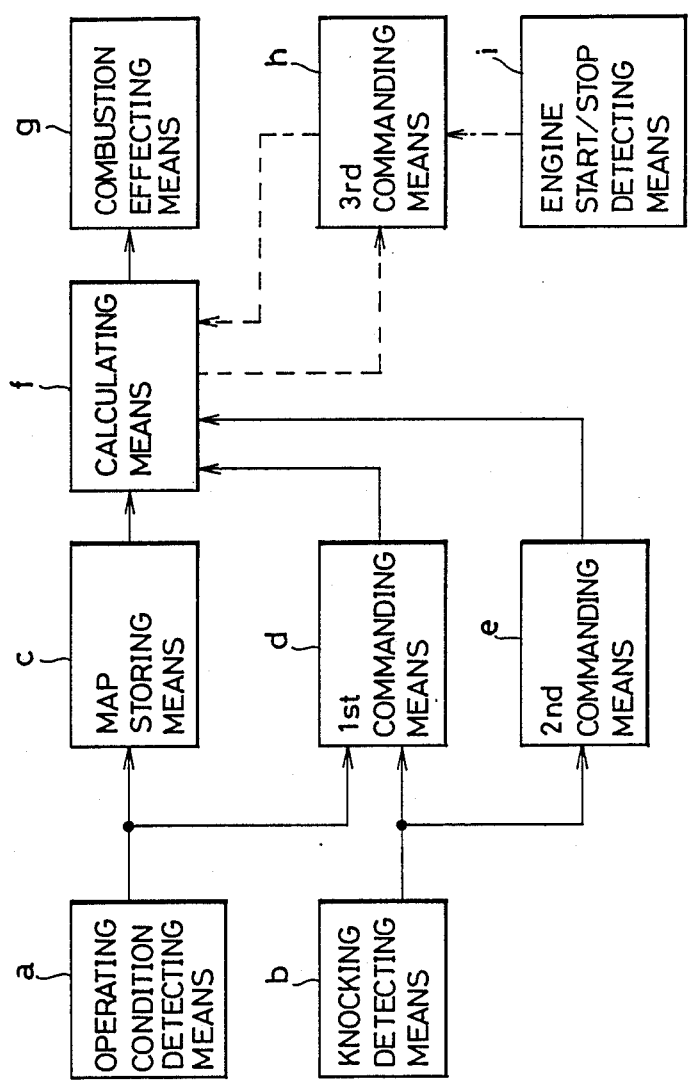
FIG. 1 is a basic schematic block diagram of the fuel combustion control apparatus for an engine according to the present invention.

FIG. 1 is a basic schematic block diagram of the control apparatus for an engine according to the present invention. The apparatus comprises engine operating condition detecting means a for detecting engine operating conditions; knocking detecting means b for detecting a presence of engine knocking; a map storing means c for storing a regular map indicative of ignition advance angles with respect to engine operating conditions using regular gasline, a highoctane map indicative of basic ignition advance angles with respect to engine operating conditions using highoctane gasoline, a reference map switching line indicative of standard ignition advance angles with respect to engine operating conditions along which the regular map is switched to the highoctane map, and a maximum highoctane map retard angle line with respect to the engine operating conditions along which the highoctane map is switched to the regular map; first commanding means d, for incrementing a current ignition advance angle during use of the regular map when the first detecting means detects operating conditions within a predetermined switching range and the second detecting means detects no knocking, and generating a first command to switch the regular map to the highoctane map only when the incremented ignition advance angle is equal to or larger than the reference map switching line and the maximum highoctane map retard angle line simultaneously; second command means e for decrementing a current ignition advance angle during use of the highoctane map when said second detecting means detects knocking, and generating a second command to switch the highoctane map to the regular map only when the decremented ignition advance angle is smaller than the maximum highoctane map retard angle; calculating means for selecting any one of the regular and highoctane maps in response to the commands from the first and second commanding means and for calculating actual ignition advance angles on the basis of basic advance angles stored in the selected map; and means for effecting fuel combustion on the basis of the ignition advance angle calculated by the calculating means.

In the controlling apparatus according to the present invention, when the engine operating conditions lie within a predetermined switching range, ignition timing is advanced at a predetermined advance angle rate in the regular map and then switched to the highoctane map only when the advance angle is equal to or larger than the reference map switching value and the maximum highoctane map retard angle value simultaneously. Therefore, once the map has been switched, combustion control is made on the basis of the highoctane map as long as knocking is not produced, so that it is possible to prevent hunting between the two maps, thus providing better control stability.

Figure 2:
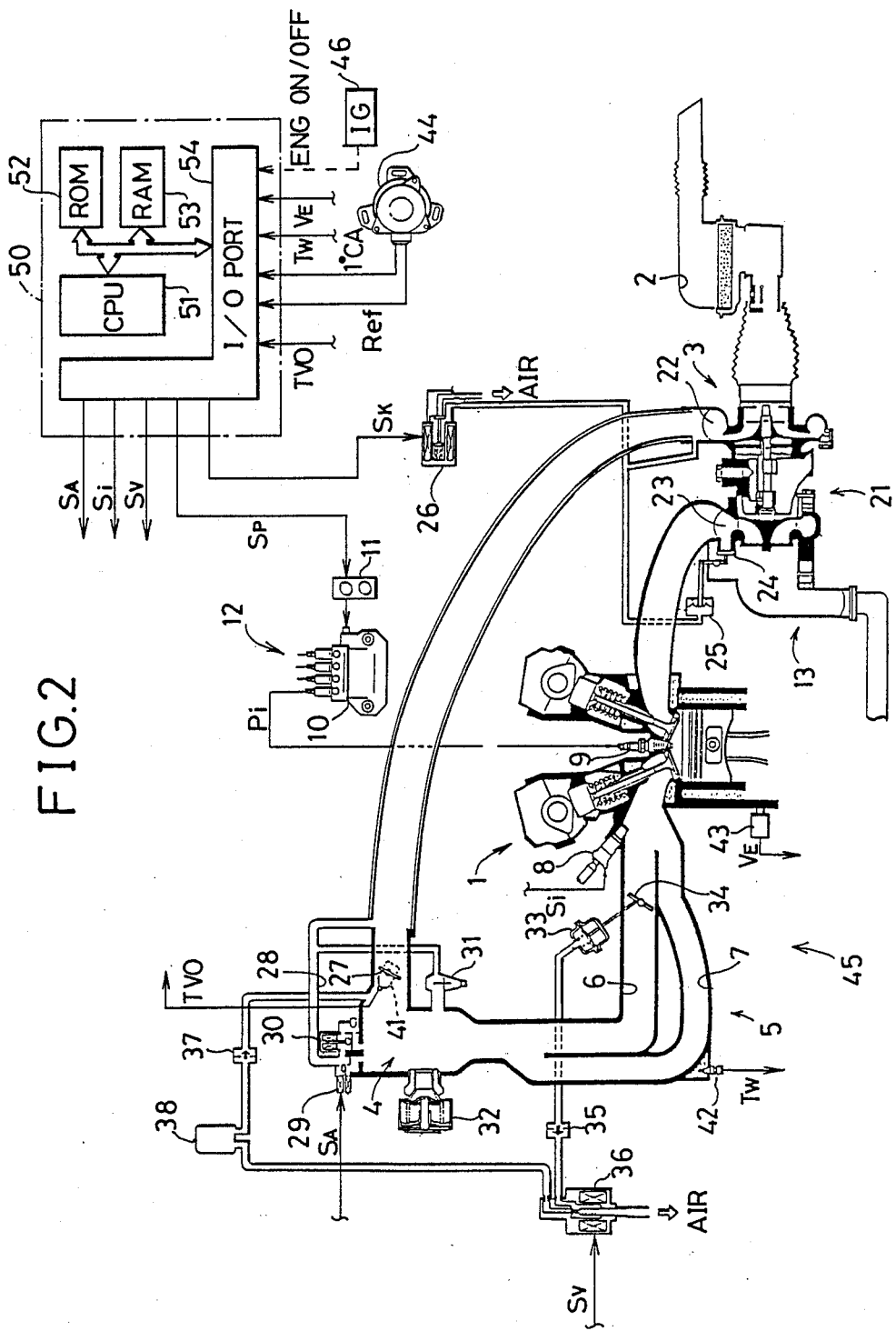
FIG. 2 is a diagrammatical illustration including a block diagram for showing a more practical fuel combustion control apparatus for an engine according to the present invention.

FIG. 2 shows an embodiment of the controlling apparatus of the present invention. In an engine 1 shown in FIG. 2, intake air is supplied to each cylinder by way of an air cleaner 2, an intake pipe 3, a throttle chamber 4, and an intake manifold 5 including a main port 6 and a subport 7 corresponding to each engine cylinder. On the other hand, fuel is injected through an injector 8 on the basis of fuel injection signals $S_i$. Each cylinder is provided with an ignition plug 9 to which a high tension pulse signal $P_i$ is supplied from an ignition coil 10 and a power transistor unit 11. The ignition coil 10 and the power transistor unit 11 generate a high tension pulse signal $P_i$ on the basis of an ignition signal $S_p$ outputted from the control unit 50 in accordance with a predetermined ignition timing, and supply this signal $S_p$ to the ignition plug 9. The above ignition plug 9, the ignition coil 10 and the power transistor unit 11 constitute combustion effecting means for effecting fuel combustion in the preferred embodiment. In this embodiment, although ignition timing is controlled, it is also possible to control an amount of fuel to be injected, a turbo charger pressure, etc. Once ignited, a mixture gas introduced into the cylinder is ignited, exploded in response to the high tensions pulse $P_i$ and then exhausted through an exhaust pipe 13.

Here, the intake air is subjected to various controls before reaching each cylinder. In more detail, a compressor 22 of a tube charger 21 is connected to the intake pipe 3, and this compressor 22 is connected to a turbine 23 disposed in the exhaust pipe 13. This turbo charger 21 is driven by exhaust gas to drive the turbine 23, so that intake air is supercharged by the compressor 22 connected to the turbine 23. This turbo charger pressure of the turbo charger 21 can be adjusted by a swing valve 24 and a swing valve controller 25. Pressure to control the swing valve controller 25 can be adjusted by a turbo charger pressure control solenoid valve 26 actuated in response to a turbo charger pressure control signal $S_k$. A throttle valve 27 is disposed within the throttle chamber 4 on the downstream side of the turbo charger 21. In ordinary engine operation, except idling, the amount of intake air is controlled by the throttle valve 27. In engine idling operation, the amount of intake air is controlled by an ACC valve 29 and an FICD solenoid valve 30 provided in a bypass passage 28 communicating between the upstream side and the lower stream side of the throttle valve 27. The opening rate of this ACC valve 29 is adjusted in response to idling speed control signal $S_A$ to control the amount of intake air so that the engine idling speed is maintained at a target value. The FICD solenoid valve 30 is opened when a predetermined auxiliary machine (e.g. air conditioning system) is actuated to increase the amount of intake air by a predetermined amount so that the engine idling speed is increased to a predetermined speed. Further, an air regular 31 connected between the upstream side and the downstream side of the throttle valve 27 introduces atmospheric air on the upstream side of the throttle valve 27 to the downstream side thereof to always keep fuel pressure applied to the injector 8 at a constant level. An intake relief value 32 (safety valve) serves to relieve intake air within the throttle chamber 4 to the air, when the intake air pressure (the turbo charger pressure) within the throttle chamber 4 rises abnormally high, to reduce the turbo charger pressure down to a safety pressure.

The intake air within the throttle chamber 4 branches from the intake manifold 5 into the main port 6 and the subport 7. Within the main port 6 formed with a relatively large aperture, a power valve 34 opened/closed by a variable intake air control actuator 33 is disposed. To this variable intake air control actuator 33, a control vacuum is supplied from a variable intake air control solenoid valve 36 via a delay valve 35. This variable intake air control solenoid valve 36 leaks the intake vacuum on the downstream side of the throttle valve 27, introduced via the check valve 37 and the vacuum tank 38 to the air on the basis of the power valve switching signal $S_V$, in order to adjust the control vacuum supplied to the variable intake air control actuator 33. The variable intake air control actuator 33 opens/closes a power valve 34 in response to the adjusted control vacuum.

On the other hand, the subport 7 is smaller in diameter and longer in length as compared with the main port 6. When the engine 1 is operating at a low speed, the power valve 34 is closed, so that the intake air flows through the subport 7. Accordingly, the speed of the intake air is increased; the charging efficiency is increased; and the engine torque is increased. On the other hand, when the engine is operating at a high speed, the power valve 34 is opened, so that the intake air flows through both the main port 6 and the subport 7. Accordingly, the resistance in intake air flow is decreased; and the engine output is increased.

The engine operating conditions can be detected by various sensors. The opening rate TVO Of the throttle valve 27 is detected by a throttle sensor 41; the coolant temperature TW is detected by a coolant temperature sensor 42; a presence of engine knocking vibration $V_F$ is detected by a knocking sensor 43; an engine crank angular position is detected by a crank angle sensor 44. The crank angle sensor 44 outputs an angle unit (1 degree) signal CA corresponding to a one-degree crank angle and a cylinder reference signal Ref for distinguishing each cylinder. The above throttle sensor 41, the coolant temperature sensor 42 and the crank angle sensor 44 constitute engine operating condition detecting means 45.

A control unit 45 shown in FIG. 2 functions in the preferred embodiment as map storing means c, the first commanding means d, the second commanding means e, and the calculating means f, which is composed of a CPU 51, a ROM 52, a RAM 53 and an I/O port 54. The CPU 51 receives external data required via the I/O port in accordance with a program stored in the ROM 52 and transfers data between the ROM 52 and the RAM 53 to calculate values required for controlling engine combustion. The calculated data are outputted via the I/O port 54 where necessary. Various sensor signals of the above sensors 41 to 44 are inputted to the CPU 51 via the I/O port 54 and various control signals $S_i$, $S_p$, $S_k$, $S_A$ and $S_v$ are outputted via the I/O port 54. The calculation programs, the regular map, the highoctane map, etc. are stored in the ROM 52, while various data used for calculation, calculated results, etc. are stored in the RAM (called working memory) 53, temporarily.

The operation of the control apparatus will be described hereinbelow.

In feedback control systems, in general, a physical value to be controlled is detected, and a difference between the detected physical value and a target value is reduced by correcting an object to be controlled. The target values in a feedback control system are determined in the form of three dimensional maps, for instance, under due consideration of practical external disturbance factors against the object to be controlled. For example, in the case of engine fuel combustion control where two, regular and highoctane, gasolines are supplied, two different, regular and highoctane, maps are formed, respectively to reduce the map scale by reducing the number of mapping addresses and by effectively utilizing the memory areas. This is because when a single map taking into account all the factors of both the gasolines is formed, the map scale is extraordinarily increased. Further, usually either one of regular or highoctane gasoline is always supplied to the engine and the two gasolines will not be changed whenever the vehicle is refueled. Furthermore, once refueled, the same gasoline is used continually until the next refuelling.

Accordingly, a regular map and a highoctane map are formed separately to reduce the map scale. In this case it is important to smoothly select one of these two maps; that is, it is necessary to smoothly select target values according to the fuel to be used, from the standpoint of control stability.

Figure 3:
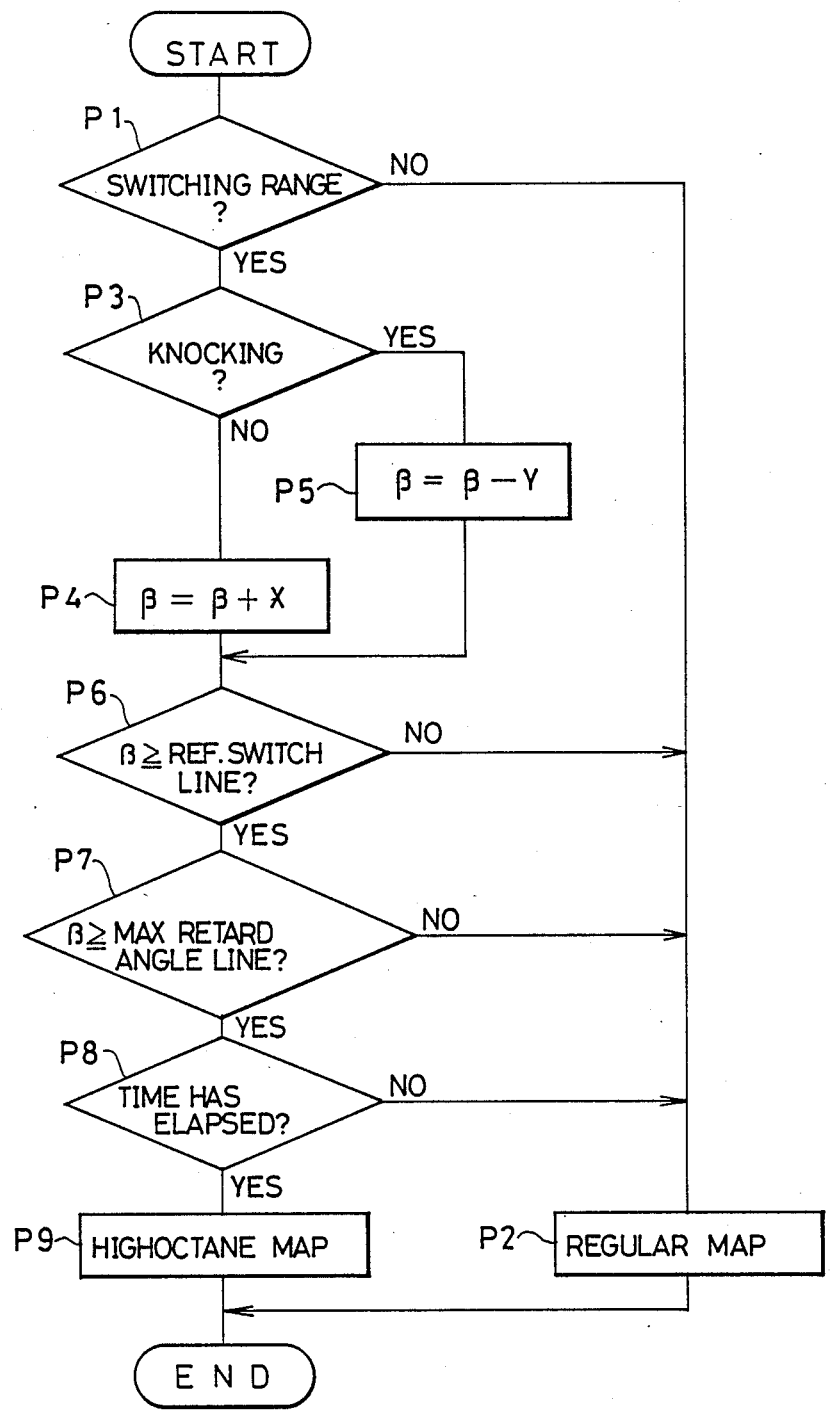
FIG. 3 is a flowchart showing a control program for executing fuel combustion processing.

FIG. 3 shows a control flowchart for assistance in explaining the fuel combustion control operation of the present invention, which is stored in the RAM 53 and executed at predetermined time intervals in dependence upon timer interrupter operation.

Figure 4:
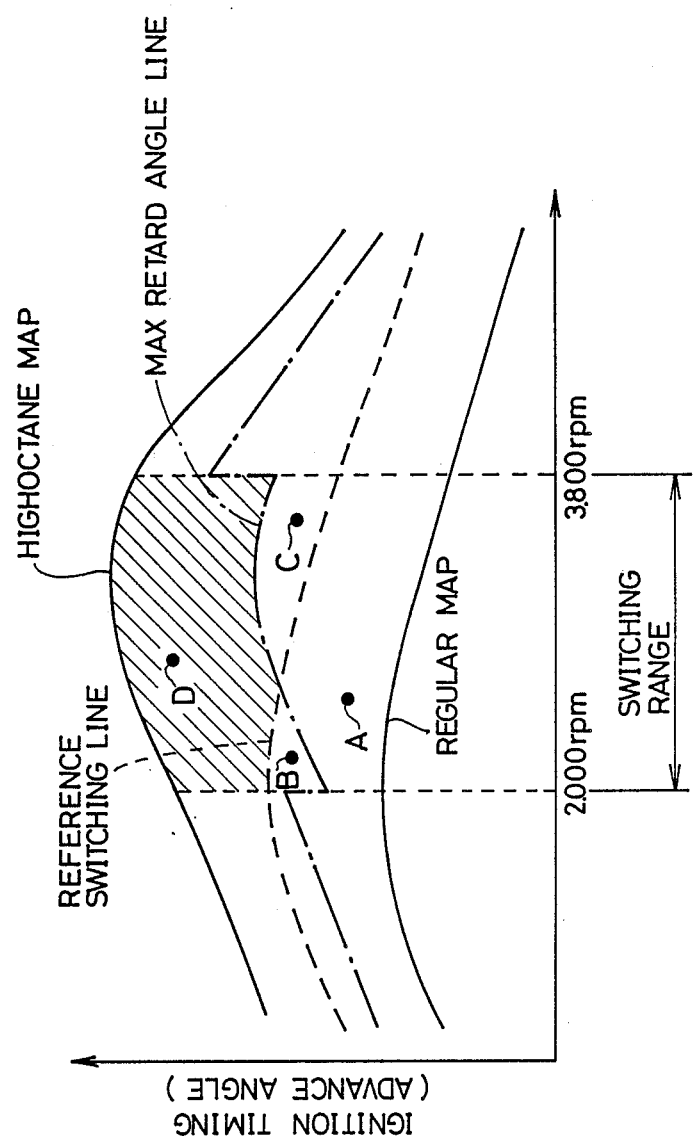
FIG. 4 is a graphical representation for assistance in explaining the regular and highoctane maps, the reference map switching advance angle line, and the maximum highoctane map retard angle line in relation to engine speed.

Control first discriminates whether the engine operating conditions lie within a predetermined switching range (in process $P_1$). This switching range is an engine speed range from about 2000 to 3000 rpm, for instance in this embodiment as shown in FIG. 4. This switching engine speed is set to an appropriate range according to the type of engine. Further, an amount of fuel to be injected can be determined as a basis for this switching range.

If NO (in process $P_1$); that is, if engine speed is equal to or lower than 2000 rpm (as when started) or equal to or higher than 3800 rpm, control proceeds to the succeeding process to select regular gasoline specifications (in process $P_2$). In the regular gasoline specifications, the final ignition timing $ADV_i$ is calculated in accordance with the following formula (1):

$$ADV_i = ADV_r + BETA \tag{1}$$

where $ADV_R$ denotes basic ignition timings looked up from a regular map and BETA denotes map correction values such as a retard angle correction value of a knocking control, a switching advance angle value $\beta$, etc. On the basis of the final calculated ignition timing $ADV_i$, ignition timing signals $S_p$ are outputted to ignite the mixture.

On the other hand, if YES (in process $P_1$); that is, if the engine speed lies within the switching range and therefore engine speed is higher than 2000 and lower than 3800 rpm, control detects whether there exists an engine knocking on the basis of a knocking signal $V_E$ (in process $P_3$). If there exists no engine knocking, the switching advance angle $\beta$ is corrected (incremented) toward the advance angle side as $\beta = \beta + X$ (in process $P_4$). If there exists engine knocking, the switching advance angle $\beta$ is corrected (decremented) toward a retard angle side as $\beta = \beta - Y$ (in process $P_5$). In more detail, in the case of an absence of knocking, a predetermined advance angle value (e.g. 1 degree) is added to the present advance angle value $\beta$ for providing a single step advance angle correction (in process $P_4$). In the case of a presence of knocking, a predetermined retard angle (e.g. 1.2 degrees) is subtracted from the present advance angle value $\beta$ for providing a single step retard angle correction (in process $P_5$). As long as the engine speed lies within the switching range, the above operation is repeated. As a result, when knocking is present, the advance angle $\beta$ is shifted to the retard angle side by increasing the number of retard angle correction steps. When no knocking is present, the advance angle $\beta$ is shifted to the advance angle side by increasing the number of advance angle correction steps.

Control discriminates whether the advance angle value $\beta$ corrected toward an advance or retard angle side is equal to or larger than the reference map switching line value (in process $P_6$). If NO, control selects the regular specifications (in process $P_2$). If YES, control further discriminates whether the advance angle value $\beta$ corrected toward an advance or retard angle side is equal to or larger than the maximum highoctane map retard line value (in process $P_7$). If NO, control selects the regular specifications (in process $P_2$).

Here, the maximum highoctane map retard angle line is formed as a map by measuring ignition timings on the maximum retard angle side controllable at each engine speed when highoctane rating fuel is used for an engine. On the other hand, the reference map switching line is determined a uniform advance angle width away from the regular map on the basis of experiments, both as depicted in FIG. 4. Therefore, there exists a range where the maximum highoctane map retard angle line is set on the advance angle side beyond the reference map switching line at a higher engine speed range.

As already described, in the prior-art apparatus, the regular map is simply switched to the highoctane map when the advance angle of ignition timing increases beyond the reference map switching line, and further the highoctane map is simply switched to the regular map when the advance angle decreases below the maximum highoctane map retard angle line. Therefore, in the prior-art apparatus, since the regular map is simply switched to the highoctane map even in a range where the advance angle is higher than the reference map switching line but lower than the maximum highoctane map retard angle line, the highoctane map is returned to the regular map at the succeeding processing, thus resulting in hunting operation.

In contrast with this, in the present invention, since the regular map is switched to the highoctane map only when the advance angle is equal to or higher than both the reference map switching line and the maximum highoctane map retard angle line, it is possible to prevent the above-mentioned hunting operation involved in the prior-art apparatus.

With reference to FIG. 3 again, control checks whether a predetermined time has elapsed after the advance angle exceeds both the reference map switching line and the maximum highoctane map retard angle line (in process $P_8$). If NO, control selects the regular map (in process $P_2$). In the present invention, since the advance angle correction as explained in process $P_4$ is repeated whenever this control program is executed, the advance angle $\beta$ is advanced step by step. Therefore, after a predetermined time has elapsed, since control determines YES (in process $P_8$), the highoctane specifications are selected (in process $P_9$).

In the highoctane specifications, the processing is executed as follows: a basic advance angle $ADV_H$ according to the current operating conditions is selected using a look-up method from the highoctane map.

In this moment, if knocking is not present, this selected advance angle $ADV_H$ is used as it is. If knocking is present, calculation is made to retard this advance angle $ADV_H$. Thereafter, control checks the switching conditions from the highoctane map to the regular map as follows: If knocking occurs frequently in the highoctane map, the basic advance angle $ADV_H$ is retarded step by step. When the retarded basic advance angle is retarded down to the maximum highoctane map retard angle line, the highoctane map is switched to the regular map.

In the highoctane map, the final ignition timing (advance angle) $ADV_i$ is calculated in accordance with the following formula:

$$ADV_i = ADV_H + BETA \qquad (2)$$

where $ADV_H$ denotes basic ignition timings looked up from a highoctane map and BETA denotes map correction values such as a retard angle correction value of a knocking control, etc. As described above, in the same way as in the regular specifications, ignition timing signals $S_p$ are outputted to ignite the mixture on the basis of the final calculated ignition timing $ADV_i$.

The map switching operation of the apparatus according to the present invention will be explained with reference to FIG. 4 in comparison with the prior-art apparatus. FIG. 4 shows the relationship between engine speeds and ignition timings represented by advance angles, in which there are described a line indicative of the highoctane map, a line indicative of the regular map, a reference map switching line at which the regular map is switched to the highoctane map and a maximum highoctane map retard angle line at which the highoctane map is switched to the regular map.

When engine speed increases into a switching range in use of the regular map, the ignition timing is advanced to a point A in FIG. 4. In this case, since the advance angle is below the reference switching line, the regular specifications are maintained in the same way as in the prior-art apparatus. Thereafter, when the ignition timing is further advanced to a point B, since this point is still below the reference map switching line, the regular specifications are maintained in the same way as in the prior-art apparatus.

When engine speed increases to a switching range where advance angles along the maximum highoctane map retard angle line are larger than those along the reference map switching line and further the ignition timing is advanced to a point C, in the prior-art apparatus the regular map is switched to the highoctane map, so that hunting occurs. In the present invention, however, since the advance angle does not reach the maximum highoctane map retard angle line, the regular specifications are maintained to prevent map switching hunting. When the ignition timing is advanced beyond the maximum highoctane map retard angle line to a point D, since the advance angle exceeds both the reference map switching line and the maximum highoctane map retard angle line, the regular map is switched to the highoctane map. Therefore, it is possible to prevent occurrence of hunting within the switching range in which the maximum highoctane map retard angle line is larger than the reference map switching line in advance angle, thus improving the control stability.

As described above, in the apparatus of the present invention, since the regular map is switched to the highoctane map only when the advance angle becomes equal to or larger than the reference map switching line and the maximum highoctane map retard angle line, hunting operation will not occur within the switching range where the advance angles along the maximum highoctane map retard angle line are larger than those along the reference map switching line.

In the prior-art fuel combustion control apparatus, in the case of a highoctane vehicle on which an engine designed for highoctane gasoline is mounted, the ignition timings are controlled on the basis of the highoctane map immediately after the engine has been started. On the other hand, in the case of a regular vehicle on which an engine designed for regular gasoline is mounted, the ignition timings are controlled on the basis of the regular map immediately after the engine has been started. That is, the kind of fuel (highoctane or regular gasoline) can be determined on the basis of occurrence of knocking produced immediately after the engine has been started to select an appropriate map. Therefore, either of highoctane or regular gasoline can be used in both the highoctane and regular vehicles.

In the prior-art apparatus, however, since the highoctane map is used at the start of a highoctane vehicle, when regular gasoline is used for the highoctane vehicle, the ignition timing is determined to an over advance angle on the basis of the highoctane map, so that knocking will be produced. In this case, since the highoctane map is switched to the regular map, no problem arises in the ordinary engine running. However, it is not preferable to produce engine knocking whenever an engine is started, from the standpoint of engine durability.

On the other hand, since the regular map is used at the start of a regular vehicle, when highoctane gasoline is used for the regular vehicle, the ignition timing is determined on the basis of the regular map, and the regular map is switched to the highoctane map after the ignition timing has been advanced repeatedly. Therefore, it is impossible to utilize the function of the highoctane gasoline or to increase the engine output at the start of the engine.

To overcome this problem, in the apparatus of the present invention, the map used immediately before the engine is stopped is checked, stored during engine stop, and is used again immediately after the engine is started again. That is, since an appropriate map according to the fuel can be selected immediately after engine start, it is possible to improve the engine performance immediately after the engine has been started.

With reference to FIG. 1 again, the apparatus of the present invention further comprises engine start/stop detecting means i for detecting engine start and engine stop, and third commanding means h for checking the map used immediately before the engine is stopped, holding the checked map while the engine is stopped and generating a third command to the calculating means to use the held map again immediately after the engine has been started again.

With reference to FIG. 2 again, an ignition switch 46 is connected to the control unit 50 via the I/O port. When this switch 46 is actuated at engine start or at engine stop, an engine start/stop signal ENG ON/OFF is outputted from the ON terminal. This engine start/stop signal is at a high-voltage level when the engine is started and at a low-voltage level when the engine is stopped. This ignition switch 46 serves as engine start/stop detecting means. Further, it is also possible to output an engine start signal from the START terminal and an engine stop signal from the ACC terminal of the ignition key switch 46. Further, engine start/stop can be detected on the basis of a change in the unit (1°) signal CA outputted from the crank angle sensor 44.

The third commanding means is incorporated in the control unit 50.

Figure 5:
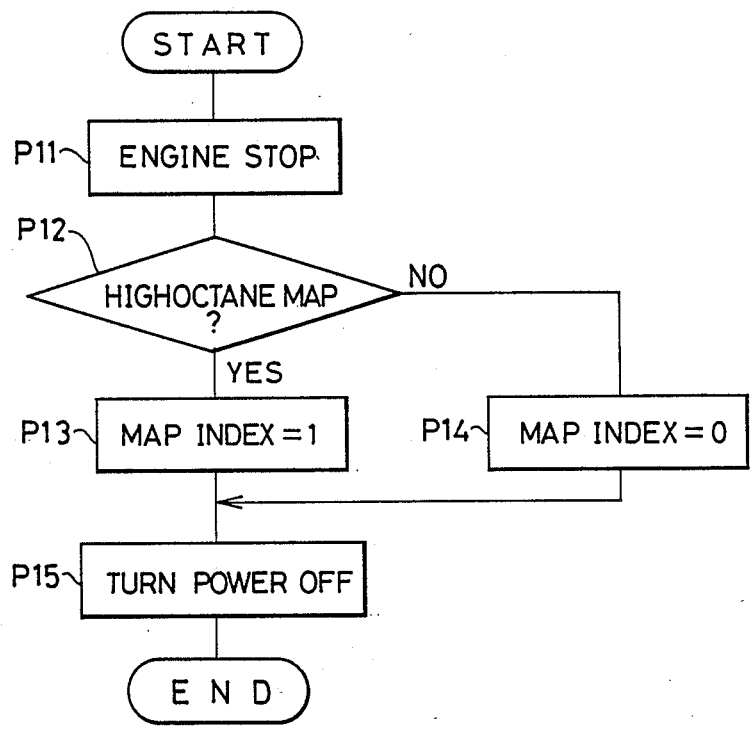
FIG. 5 is a flowchart showing an after-combustion control processing executed immediately after the engine stops.

FIG. 5 shows a flowchart stored in the ROM 52 in the control unit 50 and called "after program" executed after engine stop. Further, FIG. 6 shows a flowchart called "before program" executed before engine start.

When the driver turns an ignition key from "ON" to the "ACC" or "LOCK" position, the engine 1 stops and the engine start/stop signal ENG ON/OFF outputted from the ignition key switch 46 changes from an H-level to an L-level. In response to this voltage change, control detects that the engine stops (in process $P_{11}$,) control checks whether the map now in use is the highoctane map or not in accordance with the combustion control program (in process $P_{12}$). If YES, that is, if the map is the highoctane map, the map index is set to "1" (in process $P_{13}$). If NO, that is, if the map is the regular map, the map index is set to "0" (in process $P_{14}$). Further, when the map index is set (in process $P_{13}$ or $P_{14}$), a predetermined memory error index is set to "1". The map index and the memory error index are stored in predetermined addresses in the RAM 53 even after the ignition key switch has been turned off (because backuped by the battery). Thereafter, control proceeds to the next step to turn off the power of the control unit 50 (in process $P_{15}$). Therefore, since the map index is stored by battery backup operation even during engine stop, the map used before engine stop is stored in the form of an index, where "1" indicates the highoctane map and "0" indicates the regular map, for instance.

Figure 6:
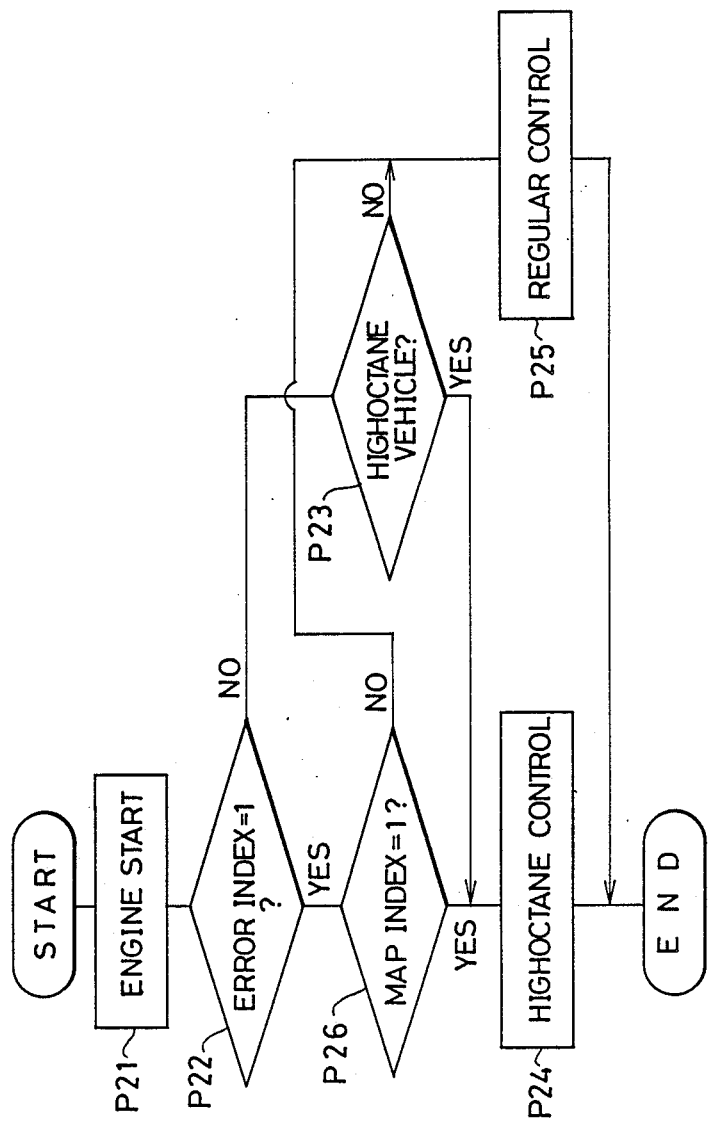
FIG. 6 is a flowchart showing a before-combustion control processing executed immediately after the engine starts.

With reference to FIG. 6, when control detects engine start on the basis of the engine start/stop signal ENG ON/OFF (in process $P_{21}$), control checks whether "1" is set to the memory error index (in process $P_{22}$). That is to say, when power supply to the battery backup area of the RAM 53 is turned off at engine stop or start due to some reason, since the memory error index (which has been set to "1" by the "after program") is reset to "0", it is possible to discriminate that the battery backup area has been kept activated to store a correct map index. If NO (in process $P_{22}$), since this indicates that the power supply to the battery backup area is has been turned off, control selects the regular map without reference to the map index (in process $P_{23}$). In this process $P_{23}$, control advances the ignition timing by a predetermined advance angle step by step. When knocking is not produced beyond the reference map switching line, control determines that the vehicle is a highoctane vehicle (in process $P_{23}$) and executes the highoctane control (in process $P_{24}$). However, if knocking is produced below the reference map switching line, control determines that the vehicle is a regular vehicle (in process $P_{23}$), and executes the regular control (in process $P_{25}$). Further, in process $P_{23}$, it is possible to simply determine whether the vehicle is a highoctane vehicle or a regular vehicle to select any one of highoctane control (map) or regular control (map).

On the other hand, if YES; that is, the memory error index ="1" (in process $P_{22}$), since this indicates that the battery backup area is has been kept normally, control checks whether the map index held at the battery backup area is "1" (in process $P_{26}$). If YES, the map used for the preceding engine operation is the highoctane map, so that the fuel is of course highoctane fuel. Control executes the highoctane control (in process $P_{24}$). If NO (in process $P_{26}$), the map used for the preceding engine operation is the regular map, so that the fuel is of course regular fuel. Control executes the regular control (in process $P_{25}$). Therefore, it is possible to select a map suitable for fuel to be used immediately after engine start. As a result, even if regular gasoline is used for the highoctane vehicle, knocking produced immediately after engine start can be prevented. Further, if highoctane gasoline is used for the regular vehicle, vehicle start performance can be improved immediately after engine start.

As described above, in the apparatus of the present invention, since the map used immediately before engine stop is checked, stored during engine stop, and used again immediately after engine restart, it is possible to always start the fuel combustion control on the basis of an appropriate map. Therefore, even if regular gasoline is used for a highoctane vehicle, knocking is prevented. Even if highoctane gasoline is used for a regular vehicle, engine start performance is improved by selecting a correct map according to fuel immediately after engine start.

What is claimed is:
1. A fuel combustion control apparatus for an engine, the fuel combustion control apparatus comprising:
   (a) first detecting means for detecting engine operating conditions;
   (b) second detecting means for detecting engine knocking;
   (c) map storing means, coupled to the first detecting means, for storing a regular map indicative of basic ignition advance angles with respect to engine operating conditions using regular gasoline, a highoctane map indicative of basic ignition advance angles with respect to engine operating conditions using highoctane gasoline, a reference map switching line indicative of standard ignition advance angles with respect to engine operating conditions along which engine control is switched from the regular map to the highoctane map, and a maximum highoctane map retard angle line indicative of engine operating conditions along which engine control is switched from the highoctane map to the regular map;
   (d) first commanding means, coupled to the first and second detecting means, for incrementing a current ignition advance angle during use of the regular map when the first detecting means detects engine operating conditions within a predetermined switching range and the second detecting means detects no knocking, and for generating a first command to switch engine control from the regular map to the highoctane map only when an incremented ignition advance angle is equal to or larger than the reference map switching line and the maximum highoctane map retard angle line simultaneously;
   (e) second command means, coupled to the second detecting means, for decrementing a current ignition advance angle during use of the highoctane map when the second detecting means detects knocking, and for generating a second command to switch engine control from the highoctane map to the regular map only when a decremented ignition advance angle is smaller than the maximum highoctane map retard angle;
   (f) calculating means, coupled to the map storing means and the first and second commanding means, for selecting any one of the regular and highoctane maps in response to commands from the first and second commanding means and for calculating actual ignition advance angles on the basis of basic advance angles stored in a selected map; and (g) means, coupled to the calculating means, for effecting fuel combustion on the basis of an ignition advance angle calculated by the calculating means.

2. A fuel combustion control apparatus of claim 1, wherein one of engine operating conditions is engine speed.

3. A fuel combustion control apparatus of claim 1, wherein one of engine operating conditions is an amount of fuel to be injected.

4. A fuel combustion control apparatus of claim 1, which further comprises:

(a) start/stop detecting means for detecting engine start and engine stop; and (b) third commanding means, coupled to the start/stop detecting means and the calculating means, for determining a particular map used immediately before engine stop, storing the particular map during engine stop, and generating a third command to the calculating means to use the particular map again immediately after the engine has been started.

5. A method of determining engine ignition advance angles on the basis of a regular map or a highoctane map, comprising the steps of:

(a) checking whether engine speed lies within a predetermined switching range;

(b) if engine speed lies outside of the predetermined switching range, selecting the regular map;

(c) if engine speed lies within the predetermined switching range, checking whether engine knocking is present or absent;

(d) if engine knocking is present, decrementing a current ignition advance angle; and if engine knocking is absent, incrementing the current ignition advance angle;

(e) checking whether the ignition advance angle is equal to or larger than a reference map switching line indicative of standard ignition advance angles with respect to engine speeds along which engine control is switched from the regular map to the highoctane map;

(f) if the ignition advance angle is smaller than the reference map switching line, selecting the regular map;

(g) if the ignition advance angle is equal to or larger than the reference map switching line, determined whether the ignition advance angle is equal to or larger than a maximum highoctane map retard angle line indicative of engine speeds along which engine control is switched from the highoctane map to the regular map;

(h) if the ignition advance angle is smaller than the maximum highoctane map retard angle line, selecting the regular map;

(i) if the ignition advance angle is equal to or larger than the maximum highoctane map retard angle line, determining whether a predetermined time has elapsed;

(j) if the predetermined time has not elapsed, selecting the regular map; and (k) if the predetermined time has elapsed selecting the highoctane map.

6. A method of determining ignition advance angles of claim 5, which further comprises the steps of:

(a) detecting whether an engine is stopped;

(b) if the engine is stopped, determining whether a used map now used is the regular map or the highoctane map;

(c) storing the used map during engine stop as a stored map;

(d) detecting whether the engine is started; and (e) if the engine has started, selecting the stored map to determine engine ignition advance angles.

7. A method of determining ignition advance angles of claim 6, which further comprises:

(a) when the engine is started, determining whether the stored map was correctly stored during engine stop;

(b) if the stored map was not correctly stored, determining whether the engine is a highoctane engine;

(c) if the engine is a highoctane engine, selecting the highoctane map; and (d) if the engine is not a highoctane engine, selecting the regular map.

* * * * *